United States Patent Office 3,427,379
Patented Feb. 11, 1969

3,427,379
DEXTROMETHORPHAN AND BENZYL ALCOHOL HARD CANDY LOZENGES FREE FROM OPAQUENESS AND/OR TINY ENTRAPPED AIR BUBBLES
Richard Henry Barry, Bloomfield, and Michael Weiss, Paramus, N.J., assignors to Hoffmann-La Roche Inc., Nutley, N.J., a corporation of New Jersey
No Drawing. Filed Jan. 13, 1966, Ser. No. 520,369
U.S. Cl. 424—14                                    3 Claims
Int. Cl. A61k *9/00;* A23g *3/00*

This invention relates, in general, to novel pharmaceutical compositions. More particularly, the invention relates to compositions having a paste-like appearance and consistency which contain an antitussive agent as the active ingredient thereof; to processes for producing same; and to the use of such compositions in preparing therapeutically effective hard candy lozenges.

Hard candy lozenges, which contain an antitussive agent as the active component, are well known in the art. The use of such lozenges to alleviate, or at least minimize, the incidence of coughs is equally well known. The production of lozenges which contain an antitussive agent as the active ingredient has, in the past, posed a variety of problems. In the first place, the antitussive agent which is selected for use must be completely compatible with the candy mass. More specifically, the antitussive agent, which is chosen for use, should not impart any property or characteristic which could make the candy mass unworkable in standard candy lozenge manufacturing equipment. Having selected the antitussive agent to be used, the problem must be solved of producing visually attractive, pleasant tasting lozenges, each of which contain a therapeutically effective quantity of the antitussive agent uniformly distributed throughout. These characteristics and properties are extremely important. Appearance and taste will, for the most part, determine whether the medicament-containing lozenge will be accepted by the consumer. On the other hand, uniform distribution of the antitussive agent throughout the lozenge is necessary to insure that the active medicament will be released, in a more or less uniform fashion, as the lozenge dissolves in the mouth.

The lozenge characteristics, referred to in the preceding paragraph, are determined to a large extent, by the ingredients present therein and by the procedure by which the lozenges are produced. For example, in normal operating procedures, uniform distribution of the antitussive agent is achieved simply by mixing that component in the heated candy mass. However, mixing, particularly if prolonged or severe, may cause air to be entrapped in the candy mass. Lozenges, prepared from such a mass, will be characterized by their opaque appearance and/or by the presence of tiny air bubbles therein. From a commercial stand point, opaque lozenges leave much to be desired. A substantially translucent lozenge is far more attractive than, and hence preferred over, an opaque lozenge. Hence, for commercial reasons, and for technological reasons, the formation of air bubbles in the mass should be avoided. Air bubbles not only detract from the appearance of the lozenge but also they often serve to distort the dimensions of the candy piece.

The entrapment of air in the candy mass is a problem which is encountered any time that an antitussive agent, in powdered form, is used. The problem becomes more acute, however, as the ratio of antitussive agent to candy mass is increased. In such an instance, the desired uniform distribution of the antitussive agent throughout the entire candy mass can be achieved only by prolonging the mixing time or by increasing the severity of the mixing operation. Either of these measures increase the likelihood that air will become entrapped in the mass, with the aforementioned attendant disadvantages. Furthermore, where the ratio of antitussive agent to candy mass is increased to provide the optimal dosage of the active medicament in lozenges of smallest acceptable size and weight, there is the danger that the medicament will cause a gritty or sandy sensation as the lozenge dissolves in the mouth or, in the case of a bitter-tasting drug, that it will impart to the lozenge an unpleasant after-taste.

In its most comprehensive embodiment, the present invention provides a therapeutic composition which contains an antitussive agent as the active ingredient.

In a more limited embodiment, the invention provides a paste-like antitussive composition which is especially well suited for use in the production of attractive, pleasant-tasting and therapeutically effective candy lozenges.

In a still further embodiment, the invention provides edible candy lozenges which contain the aforementioned antitussive composition as the active ingredient.

In the practice of this invention, there is used, as the antitussive agent, d-3-methoxy-N-methylmorphinan or a medicinally acceptable acid addition salt thereof. As used herein, the expression "medicinally acceptable acid addition salt" denotes a salt of d-3-methoxy-N-methylmorphinan with a medicinally acceptable acid. Included among the acids which can be used in producing such salts are conventional inorganic acids, such as hydrobromic acid, hydrochloric acid, phosphoric acid, nitric acid, sulfuric acid, etc., as well as conventional organic acids, such as, acetic acid, benzoic acid, citric acid, maleic acid, malic acid, salicylic acid, tartaric acid, etc. The compositions which are produced in the preferred embodiment of the invention contain, however, d-3-methoxy - N - methylmorphinan hydrobromide as the active ingredient. For sake of brevity, the term "dextromethorphan" will be used hereinafter to denote, collectively, d-3-methoxy-N-methylmorphinan, in the form of the free base, and salts of that base with medicinally acceptable acids and, individually, the free base and its acid addition salts.

The compositions of this invention are paste-like in appearance and texture and they contain the following named ingredients in the quantities hereinafter indicated:

|  | Percent by weight |
|---|---|
| Dextromethorphan | 3–15 |
| Solvent | 20–55 |
| Complex magnesium aluminum silicate | 10–50 |
| Sodium chloride | 5–15 |
| Sodium saccharin | 0.3–1.5 |

In addition to the foregoing, the compositions of the invention can contain, as optional ingredients, conventional edible coloring and conventional edible flavoring materials.

The compositions of this invention are readily prepared. In the preferred preparative method, dextromethorphan is added to, and dissolved in, a suitable solvent. The solution, thus obtained, is added to the complex magnesium aluminum silicate to form a paste-like mass. While the foregoing steps are carried out preferably at about room temperature, elevated temperatures can be employed if desired. Subsequently, sodium chloride and sodium saccharin are added to, and uniformly distributed throughout, the paste. Edible coloring and flavoring materials can be incorporated into the system at any stage of the preparative method. It is preferred, however, to add soluble ingredients to the dextromethorphan solution which is prepared in the first step. As will be more fully described hereinafter, the paste which is thus obtained can be incorporated readily into a conventional hard candy-forming mass, which mass, in turn, can be worked up, by conventional procedures, into attractive, pleasant-tasting lozenges each containing therapeutically effective quantities of dextromethorphan uniformly distributed throughout.

Variations in the foregoing preparative method are within the scope of the present invention. For example, in producing the antitussive composition of the invention, one can mix dextromethorphan and the complex magnesium aluminum silicate and subsequently add a suitable solvent thereto to form a paste therewith. Sodium chloride and sodium saccharin can be added to the dextromethorphan-complex magnesium aluminum silicate mixture prior to forming the mixture into a paste. In the alternative, sodium chloride and sodium saccharin can be added to the paste. Furthermore, suitable flavoring agents and coloring agents can be added either to the dry mixture or to the paste.

In carrying out this invention, any medicinally acceptable organic solvent which is suitable for pharmaceutical use and in which dextromethorphan is soluble can be employed. Thus, for example, organic solvents, such as propylene glycol, glycerine, 1,3-butylene glycol, benzyl alcohol, etc., can be used. In producing the preferred compositions of the invention, however, benzyl alcohol is employed as the solvent for the dextromethorphan.

In general, any commercially available complex magnesium aluminum silicate can be used in producing the compositions of this invention. Under ordinary circumstances, a complex magnesium aluminum silicate of the type sold commercially under the trade name "Veegum" is employed. The chemical analysis of Veegum, expressed as oxides, is as follows:

|  | Percent |
| --- | --- |
| Silicon dioxide | 61.1 |
| Magnesium oxide | 13.7 |
| Aluminum oxide | 9.3 |
| Titanium dioxide | 0.1 |
| Ferric oxide | 0.9 |
| Calcium oxide | 2.7 |
| Sodium oxide | 2.9 |
| Potassium oxide | 0.3 |
| Carbon dioxide | 1.8 |
| Water of combination | 7.2 |

It is preferred, however, to use the microfine, white powder marketed under the trade name Veegum F as the complex magnesium aluminum silicate component of the present compositions. Veegum F in the form of a 5.5% aqueous dispersion has a pH of about 9 and a viscosity of 250 centipoises ±25%.

As indicated heretofore, edible coloring agents and edible flavoring agents can be used, if desired, in preparing the present compositions. Flavoring agents which are suitable for use include, for example, licorice, ginger, natural fruit extracts, etc. As the coloring agent one can use any color which is suitable for use in foods and drugs. The quantity of coloring and the quantity of flavoring agents used in formulating the antitussive compositions of this invention is variable within rather wide limits. In general, however, the quantity of coloring agent and flavoring agent which is incorporated into the product will not exceed about 40% of the total weight of the paste.

In addition to the essential ingredients named heretofore, and in addition to the optional coloring and flavoring agents referred to in the preceding paragraph, there can be incorporated into the paste-like antitussive compositions of this invention, such other medicaments as are often found in conventional prior art cough and cold remedies. These include, for example, topical anesthetic, or throat-soothing, agents such as, ethyl amino-benzoate; diperodon hydrochloride, etc. Additionally, benzyl alcohol is often used in pharmaceutical compositions as a topical anesthetic, or throat-soothing, agent. Accordingly, in those instances in which benzyl alcohol is employed as the solvent for dextromethorphan, benzyl alcohol will serve a dual purpose, namely, as the solvent for the dextromethorphan and as a nontoxic topical anesthetic or soothing agent. Where some other compound is used as the solvent for dextromethorphan, benzyl alcohol, or some other topical anesthetic or throat-soothing agent, can be embodied in the compositions as an optional ingredient.

The paste-like antitussive compositions of this invention are, as indicated heretofore, particularly designed for use in the production of candy lozenges. The manner in which such lozenges are produced will be readily apparent to persons skilled in the art. In general, the preparative method involves the use of conventional candy making equipment and techniques and the utilization of the ingredients ordinarily employed in making hard candy lozenges. A candy mass, suitable for use in producing hard candy lozenges contains, for example, from about 55% to about 75% by weight of sucrose solids, from about 25% to about 45% by weight of corn syrup solids, not more than about 1% of water and coloring materials, as needed and desired. In preparing lozenges, the first step involves the production of the aforementioned candy mass. This entails mixing sucrose and corn syrup solids in a pre-cooker at an elevated temperature. While the temperature used is variable, it is the ordinary procedure to operate at a temperature of about 235° F. so as to effect the removal of a major portion of the water present in the mass. Thereafter, the candy mass is heated in a vacuum cooker at a temperature of from about 290° to about 295° F. at 28" vacuum. In the vacuum cooker the water content of the candy mass is reduced to below 1%, and, preferably, to about 0.5% to 0.6% by weight. In the next operative step, the paste-like antitussive composition of this invention is distributed throughout the warm candy mass using a convenional candy mixing machine where an edible paste dye, or a mixture of such dyes, can then be added, if desired. The mixture is kneaded until homogeneous, following which it is formed into lozenges by conventional procedures. In one such procedure, the mixture is formed into a rope, using a vertical batch feeder, and the rope is converted, by appropriate means, into lozenges of desired shape and size.

The quantity of the paste-like antitussive composition of this invention which is used in the production of hard candy lozenges is variable within wide limits. In general, the quantity employed should be sufficient to provide individual lozenges, each of which contain a therapeutically effective amount of dextromethorphan. In the preferred practice of the invention, lozenges are produced which weigh from about 2.0 to about 4.0 grams and which contain from about 5.0 mg. ot about 10.0 mg. of dextromethorphan. In general, lozenges, having the desired dextromethorphan content, are produced from a mass obtained by mixing from about 0.3 to about 1.25 parts by weight of the paste-like antitussive composition of this invention with from about 35 to about 40 parts by weight of candy mass. The mixture, thus obtained, is subsequently converted into the lozenges of desired shape and size by conventional procedures.

The present invention provides antitussive compositions which are uniquely suited for use in producing lozenges. The lozenges which are produced using the antitussive compositions described herein have been found to be effective in eliminating, or minimizing, the incidence of coughing or alleviating the severity of a cough. The lozenges are attractive in appearance, being substantially translucent and free of air bubbles. Furthermore, they are completely devoid of the unpleasant taste that normally attends the oral administration of dextromethorphan. This is true despite the fact that, in the preferred embodiment of the invention, lozenges are produced which contain a relatively high level of the active medicament.

For a fuller understanding of the nature and objects of this invention, reference may be had to the following example which is given merely as a further illustration of the invention and is not to be construed in a limiting sense. All parts given in the example are parts by weight, unless indicated to the contrary.

EXAMPLE

(A) Paste concentrate production

Into a suitable mixer there was charged the following named ingredients in the proportions hereinafter indicated:

|  | Parts |
|---|---|
| Dextromethorphan | 106.62 |
| Benzyl alcohol | 344.0 |
| Flavoring Oils | 233.38 |

The ingredients were thoroughly admixed. Thereafter, the solution, thus obtained, was added to 400.0 parts of the microfine, white powdery complex magnesium aluminum silicate which is manufactured and sold by R. T. Vanderbilt Co., New York, N.Y., under the trade name Veegum F. The mixture was admixed until a smooth homogeneous paste was obtained.

In a separate operation, a mixture of 105.0 parts of sodium chloride and 7.0 parts of sodium saccharin was passed through a comminuting mill, more particularly, a Fitzmill, operating at high speed, hammers forward, using a No. 00 screen. This mixture was added to the paste concentrate, produced as described in the preceding paragraph, and the resulting mixture was itself mixed until uniform. The product, thus obtained, was in the form of a paste concentrate.

(B) Candy mass production

In producing a candy mass suitable for use in the production of lozenges, 29,380 parts of sucrose from No. 1 sucrose syrup (obtained from American Sugar Company) and 15,710 parts of corn syrup solids from corn syrup were charged to a pre-cooker where they were admixed at a temperature of about 235° F. until a major portion of the water present therein had been removed. The mass, thus obtained, was transferred to a vacuum cooker where it was heated at a temperature within the range of from about 290° F. to about 295° F. at 28" vacuum until it contained less than about 0.6% of water.

(C) Lozenge production 100 pounds of the warm candy mass, produced as described in section (B) of this example, was admixed, in a kneading machine, with 1196 grams of the paste concentrate produced as described in section (A) of this example. Thereafter, 56.72 parts of a paste dye were added to the mixture. The paste dye used was Brilliant Red Crimson Paste R which contained 12% of FD&C Red No. 2 and FD&C No. 6 dyes, propylene glycol, dextrose and glycerine. The mixture was then kneaded until it was homogeneous. The mixture was transferred to a conventional vertical batch feeder where it was formed into a rope of candy. The rope was converted into lozenges using the Super Robust 85A Machine, the lozenges, thus formed, then being cooled on a cooling conveyor.

The lozenges, thus obtained, weighed about 2.25 grams, each such lozenge containing 5.0 mg., plus a 1% excess, of dextromethorphan. The lozenges were substantially uniform in size and shape, and had a pleasant taste. They were substantially translucent, free of entrapped air bubbles and they were devoid of any unpleasant after-taste.

We claim:

1. An antitussive composition, in the form of a substantially translucent hard candy lozenge free from opaqueness and/or tiny air bubbles entrapped therein, which consists essentially of (a) from about 35 to about 40 parts by weight of a mixture of from about 55% to about 75% by weight of sucrose solids, from about 25% to about 45% by weight of corn syrup solids and (b) from about 0.3 to about 1.25 parts by weight of a mixture comprising from about 3.0% to about 15% by weight of a member selected from the group consisting of d-3-methoxy-N-methylmorphinan and a salt thereof with a medicinally acceptable acid, from about 20% to about 55% by weight of benzyl alcohol, from about 10% to about 50% of a complex magnesium aluminum silicate, from about 5% to about 15% by weight of sodium chloride and from about 0.3% to about 1.5% by weight of sodium saccharin.

2. The composition of claim 1 wherein component (b) contains from about 3.0% to about 15.0% by weight of d-3-methoxy-N-methylmorphinan hydrobromide.

3. A process for producing a substantially translucent hard candy dextro-methorphan antitussive lozenge free from opaqueness and/or tiny air bubbles entrapped therein which consists essentially of the steps of (1) heating at a temperature of about 235° F. to about 295° F. a mixture consisting essentially of from about 55% to about 75% by weight of sucrose, 25% to about 45% by weight of corn syrup solids and water until the water content of such mixture is less than about 1.0% by weight, (2) adding to, and uniformly incorporating into, such mixture, while still warm, and without unduly prolonging the mixing time and/or increasing the severity of the mixing operation a paste concentrate consisting essentially of from about 3.0% to about 15% by weight of a member selected from the group consisting of d-3-methoxy-N-methylmorphinan and a salt thereof with a medicinally accepted acid, from about 20% to about 55% by weight of benzyl alcohol, from about 10% to about 50% by weight of a complex magnesium aluminum silicate, from about 5% to about 15% by weight of sodium chloride and from about 0.3% to about 1.5% by weight of sodium saccharin and (3) converting the mixture into lozenges.

References Cited

UNITED STATES PATENTS

| | | | |
|---|---|---|---|
| 2,841,528 | 7/1958 | Myhre | 167—82 |
| 2,963,404 | 12/1960 | Hammer et al. | 167—82 |
| 3,012,893 | 12/1961 | Kremzer et al. | 99—134 |
| 3,085,942 | 4/1963 | Magid et al. | 167—67 |
| 3,123,528 | 3/1964 | Fenton | 167—55 |
| 3,140,978 | 7/1964 | Zentner | 167—55 |
| 3,248,290 | 4/1966 | Zentner | 167—55 |
| 3,282,789 | 11/1966 | Marty et al. | 167—82 |
| 3,341,414 | 9/1967 | Cherkas et al. | 167—82 |

LEWIS GOTTS, *Primary Examiner.*

S. K. ROSE, *Assistant Examiner.*

U.S. Cl. X.R.

99—134, 138; 424—260